G. A. E. MELLIN.
GEAR SHIFTING LEVER FOR AUTOMOBILES.
APPLICATION FILED NOV. 21, 1916.
1,232,449.
Patented July 3, 1917.
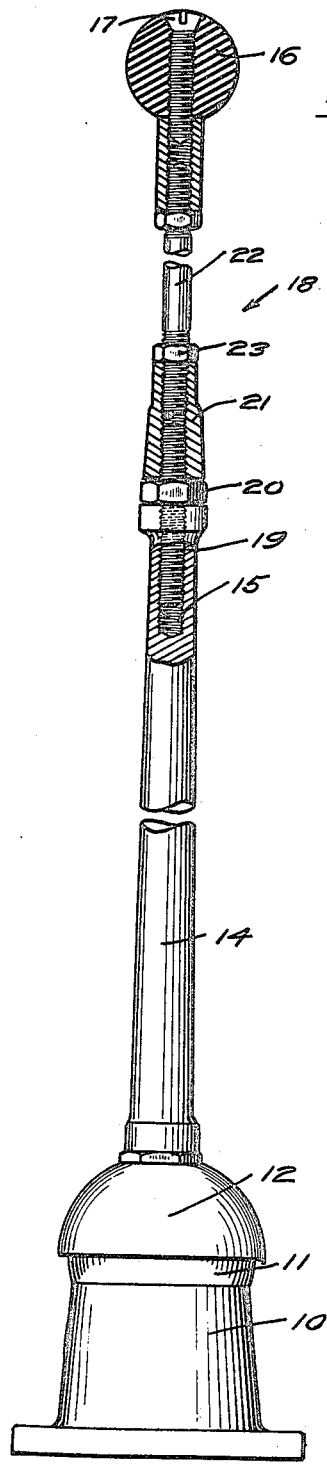
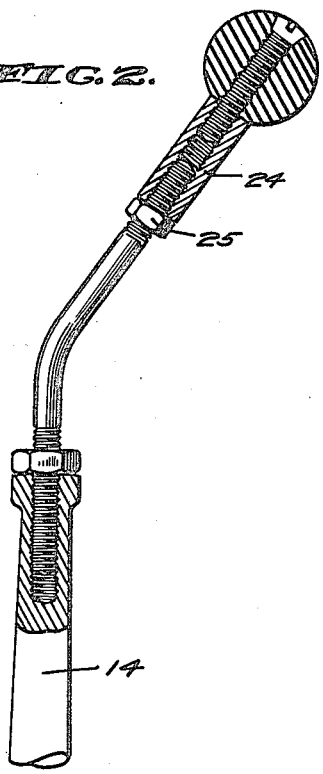
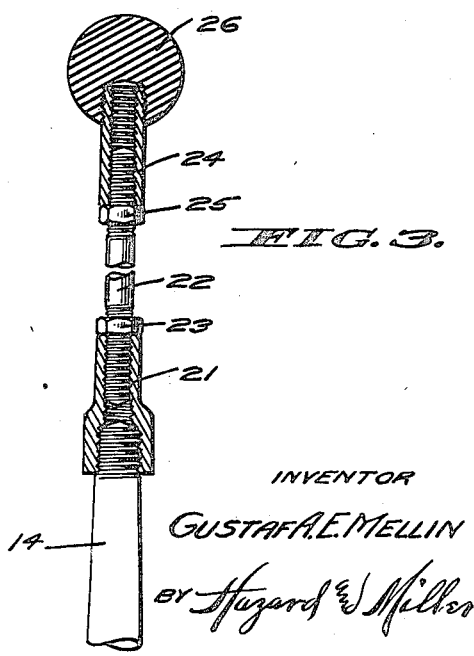
INVENTOR
GUSTAF A. E. MELLIN
ATTORNEYS

UNITED STATES PATENT OFFICE.

GUSTAF A. E. MELLIN, OF LOS ANGELES, CALIFORNIA, ASSIGNOR OF ONE-HALF TO FRED. T. HUGHES, OF LOS ANGELES, CALIFORNIA.

GEAR-SHIFTING LEVER FOR AUTOMOBILES.

1,232,449.    Specification of Letters Patent.    Patented July 3, 1917.

Application filed November 21, 1916. Serial No. 132,566.

*To all whom it may concern:*

Be it known that I, GUSTAF A. E. MELLIN, a citizen of the United States, residing at Los Angeles, in the county of Los Angeles and State of California, have invented new and useful Improvements in Gear-Shifting Levers for Automobiles, of which the following is a specification.

This invention relates to gear shifting levers and particularly pertains to the levers controlling speed changing gears of automobiles.

It has often been found that the stock gear shifting levers supplied with automobiles of common design are not adapted for the individual use of the driver. In some instances they are too short to be readily manipulated, while in other instances the handle portion of the lever is not properly spaced to be conveniently reached by the driver. It is the principal object of this invention to provide an adjustable extension adapted to be attached to the shifting levers of motor vehicles and to dispose the operating handle at a desired convenient position.

Another object is to provide an extension handle which may be positioned upon existing shifting levers without alteration of the parts or additional machining.

Another object is to provide an extension for gear shifting levers which may be secured to the shifting lever by either end and when so reversed will produce a lever of different length and shape.

It is a further object to provide an extension for gear shifting levers which is simple in its construction, is built up of parts made in duplicate, and may be instantly attached to the shifting lever and adjusted as desired.

Other objects will appear hereinafter.

The invention is illustrated, by way of example, in the accompanying drawings in which:

Figure 1 is a view in section and elevation illustrating a gear shifting lever of the common universally movable type and upon the outer end of which is mounted the extension handle with which the present invention is concerned.

Fig. 2 is a view in side elevation and section illustrating the upper end of the gear shifting lever shown in Fig. 1 and further disclosing the shape of the handle extension so as to bring it within convenient reach of the driver.

Fig. 3 is a view in section and elevation illustrating another form of extension handle for gear shifting levers as adapted for mounting upon levers having an externally threaded end portion for the reception of the handle ball.

Referring more particularly to the drawings, 10 indicates a lever bracket provided with a bearing ball 11 upon which is seated a hemispherical cup 12. This cup is secured to and adapted to move with a gear shifting lever 14 by which the speed changing gears of an automobile are controlled. Reference being had to Fig. 1 of the drawings, it will be seen that the shifting lever there shown is formed with an internal threaded bore 15 which extends from the upper end of the lever a suitable distance down its center. When the lever is assembled by the maker of the automobile, a handle ball 16 is secured upon the end of the lever by a counter-sunk screw 17 which extends into this threaded bore. This handle ball is removed when a handle extension is to be used. Levers of this design are fitted with a handle extension 18 which is composed of a central rod 19 threaded at its opposite ends. The lower end of the rod seats within the bore 15 of the lever and is locked by means of a lock-nut 20. Positioned upon the rod 19 above the lock-nut 20 is an internally threaded sleeve 21 into which the upper end of the rod 19 extends. Threaded into the upper end of the sleeve 21 is an extension rod 22 which is locked in a desired adjustable position by a nut 23 adapted to bear against the top of the sleeve 21. This extension rod may be of any desired length and bend. However, it has been found that the angularity given it and illustrated in Fig. 2 of the drawings is convenient for the accommodation of most persons. The upper end of the extension rod is threaded and extends within a handle sleeve 24 where it is adjustably locked by means of a nut 25. This sleeve is tubular and threaded internally throughout its length, the threaded bore being of corresponding diameter to that of the handle screw 17 with which the handle ball is secured to the end of the extension handle.

Reference being had to Fig. 3, it will be seen that the device is subject to variation in construction in order to accommodate shifting levers having externally threaded ends for the mounting of internally threaded handle balls. In this case the rod 19 is dispensed with and the sleeve 21 enlarged at its lower end to receive the threaded end of the lever. Rod 22 may be of any desired bend, as before stated, and is fitted with lock nuts 23 and 25. The upper end of the sleeve 24 is externally threaded and provided to receive an internally threaded handle ball 26.

In applying one of these handle extensions to gear shifting levers of either the internally or externally threaded type as disclosed in Figs. 1 and 3, respectively, the handle balls are first removed and in case the ball is constructed as the one indicated by the numeral 16, the threaded rod 19 is inserted within the bore 15 of the gear shift lever and the lock-nut and sleeve 21 mounted thereupon. The lock-nut is tightened down upon the face of the lever and thereafter the sleeve 21 is tightened against the lock-nut, thus locking the rod 19 in position and the sleeve upon the rod. Extension rod 22 is thereafter adjustably secured within the upper end of sleeve 21 and locked by nut 23. This rod may be screwed in or out of the sleeve as desired to obtain the proper lengthed lever. Mounted upon the upper end of the rod 22 is sleeve 24 upon which the handle ball 16 is held by means of screw 17. This sleeve may be adjusted in relation to the rod 22 and locked by the nut 25.

When the externally threaded lever is used, the sleeve 21 is mounted upon it, as illustrated in Fig. 3, and the other members secured as in the previously described form.

It should be noted that the rod 22 is reversible, and by reversing the rod so that the top and bottom ends occupy reversed positions a wide range of vertical and horizontal adjustment of the handle ball is attained.

It will thus been seen that the handle extension here provided is simple in its construction and may be readily applied to form an extension to gear shift levers to which it may be adjustably secured to meet the requirements of the operator.

While I have shown the preferred construction of my extension handle for gear shift levers as now known to me, it will be understood that various changes in the combination, construction, and arrangement of parts may be made by those skilled in the art without departing from the spirit of my invention.

I claim:

1. A handle extension for gear shift levers, comprising a handle grip, a reversible extension rod by which it is supported, means for detachably securing said rod to the upper end of a gear shift lever, and means whereby the rod and grip may be vertically and horizontally adjusted in relation to said lever.

2. In a handle extension for gear shift levers, the combination with a gear shift lever, of an extension member secured thereto, a handle grip positioned at the outer end of said extension member, means whereby said grip may be adjusted in relation to said extension, and means whereby the extension may be adjusted in relation to said lever.

3. In a handle extension for gear shift levers, the combination with a vertically extending shifting lever, of an extension member mounted at the end of said lever, a handle grip secured to the end of said extension, means for vertically adjusting the extension in relation to said handle, and means for diagonally adjusting the handle grip in relation to the lever.

4. In a handle extension for gear shift levers, the combination with a shifting lever, of an extension member adapted to be positioned upon the end of said lever and held by the means originally provided to hold a handle grip upon the lever end, means for securing said handle grip at the end of said extension, and means for adjusting the extension in relation to said lever and the grip in relation to said extension.

5. An extension handle for gear shift levers, comprising a threaded end member adapted to engage the end of a gear shifting lever, means for locking said member in position, an adjustable sleeve disposed above said shifting lever, an extension member adjustably secured within said sleeve, a second adjustable sleeve secured at the outer end of said extension member, and a hand grip fixed to the end of said sleeve.

6. A handle extension for gear shift levers, comprising a handle grip, an extension rod by which it is supported, means for detachably securing said rod to the upper end of a gear shift lever, independent means whereby the rod and grip may be vertically and horizontally adjusted in relation to said lever, and means for locking said rod and grip in adjusted position.

7. A handle extension for gear shift levers, comprising a handle grip, an extension rod by which it is supported, means for detachably securing said rod to the upper end of a gear shift lever, means whereby the rod and grip may be vertically adjusted in relation to said lever, and means for locking said rod and grip in adjusted position.

8. A handle extension for gear shift levers, comprising a handle grip, an extension rod by which it is supported, means for detachably securing said rod to the upper end of a gear shift lever, means whereby the rod and grip may be horizontally adjusted in relation to said lever, and means for locking said rod and grip in adjusted position.

In testimony whereof I have signed my name to this specification.

GUSTAF A. E. MELLIN.